US 6,580,981 B1

(12) United States Patent
Masood et al.

(10) Patent No.: US 6,580,981 B1
(45) Date of Patent: Jun. 17, 2003

(54) SYSTEM AND METHOD FOR PROVIDING WIRELESS TELEMATICS STORE AND FORWARD MESSAGING FOR PEER-TO-PEER AND PEER-TO-PEER-TO-INFRASTRUCTURE A COMMUNICATION NETWORK

(75) Inventors: Garahi Masood, Superior, CO (US); William C. Elkington, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/122,375

(22) Filed: Apr. 16, 2002

(51) Int. Cl.[7] .................................................. G08G 1/13
(52) U.S. Cl. ........................ 701/29; 701/96; 340/425.5
(58) Field of Search .............................. 701/29, 96, 97; 340/425.5, 435, 436, 438, 463, 540

(56) References Cited

U.S. PATENT DOCUMENTS

| | | | | |
|---|---|---|---|---|
| 4,087,753 A | * | 5/1978 | Paul ............................ | 375/237 |
| 4,494,192 A | | 1/1985 | Lew et al. ................... | 364/200 |
| 4,617,656 A | | 10/1986 | Kobayashi et al. ........... | 370/74 |
| 4,736,371 A | | 4/1988 | Tejima et al. ................. | 370/95 |
| 4,742,357 A | | 5/1988 | Rackley ....................... | 342/457 |
| 4,747,130 A | | 5/1988 | Ho .............................. | 379/269 |
| 4,873,711 A | * | 10/1989 | Roberts et al. .............. | 455/412 |
| 4,910,521 A | | 3/1990 | Mellon ........................ | 342/45 |
| 5,034,961 A | | 7/1991 | Adams ........................ | 375/130 |
| 5,068,916 A | | 11/1991 | Harrison et al. .............. | 455/39 |

(List continued on next page.)

FOREIGN PATENT DOCUMENTS

| | | |
|---|---|---|
| CA | 2132180 | 3/1996 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "Sofy Handoffs in CDMA Mobile Systems", Dec. 1997, IEEE Personal Communications.

Wong et al., "A Pattern Recogintion System for Handoff Algorithms", Jul. 2000, IEEE Journal on Selected Areas in Communications, vol. 18, No. 7.

(List continued on next page.)

Primary Examiner—William A. Cuchlinski, Jr.
Assistant Examiner—Olga Hernandez
(74) Attorney, Agent, or Firm—Roylance, Abrams, Berdo & Goodman, L.L.P.; Joseph J. Buczynski (57) ABSTRACT

A system and method for sending and receiving messages, such as status or request-for-help messages, automatically between mobile nodes and ultimately to an appropriate destination via a wireless infrastructure. When a node determines that such infrastructure is not available, the node will communicate the necessary information to another mobile node located in, for instance, a vehicle. In this case, the receiving node stores the information, then transmits the information from that node to the wireless infrastructure equipment, so that the infrastructure can forward the message to an appropriate destination once such equipment is in range of this second node.

26 Claims, 5 Drawing Sheets

U.S. PATENT DOCUMENTS

| | | | |
|---|---|---|---|
| 5,231,634 A | 7/1993 | Giles et al. ................. | 370/95.1 |
| 5,233,604 A | 8/1993 | Ahmadi et al. ............... | 370/60 |
| 5,241,542 A | 8/1993 | Natarajan et al. ........... | 370/95.3 |
| 5,317,566 A | 5/1994 | Joshi ............................ | 370/60 |
| 5,392,450 A | 2/1995 | Nossen ....................... | 455/12.1 |
| 5,412,654 A | 5/1995 | Perkins ....................... | 370/94.1 |
| 5,424,747 A | 6/1995 | Chazelas et al. .............. | 342/70 |
| 5,502,722 A | 3/1996 | Fulghum .................... | 370/69.1 |
| 5,517,491 A | 5/1996 | Nanni et al. .................... | 370/29 |
| 5,555,425 A | 9/1996 | Zeller et al. ................ | 395/800 |
| 5,555,540 A | 9/1996 | Radke ........................ | 370/16.1 |
| 5,572,528 A | 11/1996 | Shuen ...................... | 370/85.13 |
| 5,615,212 A | 3/1997 | Ruszczyk et al. ........... | 370/433 |
| 5,618,045 A | 4/1997 | Kagan et al. ................. | 463/40 |
| 5,621,732 A | 4/1997 | Osawa ........................ | 370/79 |
| 5,623,495 A | 4/1997 | Eng et al. .................... | 370/397 |
| 5,627,976 A | 5/1997 | McFarland et al. ......... | 395/308 |
| 5,631,897 A | 5/1997 | Pacheco et al. ............. | 370/237 |
| 5,644,576 A | 7/1997 | Bauchot et al. ............. | 370/437 |
| 5,652,751 A | 7/1997 | Sharony ..................... | 370/227 |
| 5,680,392 A | 10/1997 | Semaan ...................... | 370/261 |
| 5,684,794 A | 11/1997 | Lopez et al. ................ | 370/337 |
| 5,687,194 A | 11/1997 | Paneth et al. ................ | 375/283 |
| 5,696,903 A | 12/1997 | Mahany ................. | 395/200.58 |
| 5,701,294 A | 12/1997 | Ward et al. .................. | 370/252 |
| 5,706,428 A | 1/1998 | Boer et al. ................... | 395/200 |
| 5,717,689 A | 2/1998 | Ayanoglu .................... | 370/349 |
| 5,745,483 A | 4/1998 | Nakagawa et al. ......... | 370/335 |
| 5,774,876 A | 6/1998 | Wooley et al. ................ | 705/28 |
| 5,781,540 A | 7/1998 | Malcolm et al. ............ | 370/321 |
| 5,787,080 A | 7/1998 | Hulyalkar et al. .......... | 370/348 |
| 5,794,154 A | 8/1998 | Bar-On et al. .............. | 455/509 |
| 5,796,732 A | 8/1998 | Mazzola et al. ............ | 370/362 |
| 5,796,741 A | 8/1998 | Saito et al. .................. | 370/439 |
| 5,805,593 A | 9/1998 | Busche ....................... | 370/396 |
| 5,805,842 A | 9/1998 | Nagaraj et al. ............. | 395/306 |
| 5,805,977 A | 9/1998 | Hill et al. .................... | 455/31.3 |
| 5,809,518 A | 9/1998 | Lee ............................ | 711/115 |
| 5,822,309 A | 10/1998 | Ayanoglu et al. ........... | 370/315 |
| 5,844,905 A | 12/1998 | McKay et al. ............... | 370/443 |
| 5,845,097 A | 12/1998 | Kang et al. ................. | 395/297 |
| 5,857,084 A | 1/1999 | Klein ......................... | 395/309 |
| 5,870,350 A | 2/1999 | Bertin et al. ................. | 365/233 |
| 5,877,724 A | 3/1999 | Davis ......................... | 342/357 |
| 5,881,095 A | 3/1999 | Cadd .......................... | 375/202 |
| 5,881,372 A | 3/1999 | Kruys ........................ | 455/113 |
| 5,886,992 A | 3/1999 | Raatikainen et al. ........ | 370/410 |
| 5,896,561 A | 4/1999 | Schrader et al. ........... | 455/67.1 |
| 5,903,559 A | 5/1999 | Acharya et al. ............. | 370/355 |
| 5,909,651 A | 6/1999 | Chander et al. ............. | 455/466 |
| 5,936,953 A | 8/1999 | Simmons .................... | 370/364 |
| 5,943,322 A | 8/1999 | Mayor et al. ................ | 370/280 |
| 5,969,969 A * | 10/1999 | Ejiri et al. ..................... | 701/41 |
| 5,987,011 A | 11/1999 | Toh ............................ | 370/331 |
| 5,987,033 A | 11/1999 | Boer et al. ................... | 370/445 |
| 5,991,279 A | 11/1999 | Haugli et al. ................ | 370/311 |
| 6,028,853 A | 2/2000 | Haartsen ...................... | 370/338 |
| 6,029,217 A | 2/2000 | Arimilli et al. ............. | 710/107 |
| 6,034,542 A | 3/2000 | Ridgeway .................... | 326/39 |
| 6,042,008 A * | 3/2000 | Ando et al. .................. | 235/384 |
| 6,044,062 A | 3/2000 | Brownrigg et al. ......... | 370/238 |
| 6,047,330 A | 4/2000 | Stracke, Jr. .................. | 709/238 |
| 6,052,594 A | 4/2000 | Chuang et al. ............. | 455/450 |
| 6,052,752 A | 4/2000 | Kwon ......................... | 710/126 |
| 6,064,626 A | 5/2000 | Stevens ....................... | 365/233 |
| 6,067,291 A | 5/2000 | Kamerman et al. ......... | 370/338 |
| 6,078,566 A | 6/2000 | Kikinis ....................... | 370/286 |
| 6,104,712 A | 8/2000 | Robert et al. ................ | 370/389 |
| 6,108,738 A | 8/2000 | Chambers et al. .......... | 710/113 |
| 6,115,580 A | 9/2000 | Chuprun et al. ............... | 455/1 |
| 6,122,690 A | 9/2000 | Nannetti et al. ............. | 710/102 |
| 6,130,881 A | 10/2000 | Stiller et al. ................. | 370/238 |
| 6,132,306 A | 10/2000 | Trompower ................ | 453/11.1 |
| 6,147,975 A | 11/2000 | Bowman-Amuah ......... | 370/252 |
| 6,163,699 A | 12/2000 | Naor et al. ................... | 455/453 |
| 6,178,337 B1 | 1/2001 | Spartz et al. ................ | 455/561 |
| 6,192,053 B1 | 2/2001 | Angelico et al. ............ | 370/448 |
| 6,192,230 B1 | 2/2001 | Van Bokhorst et al. ..... | 455/343 |
| 6,208,870 B1 | 3/2001 | Lorello et al. ............... | 455/466 |
| 6,223,240 B1 | 4/2001 | Odenwald et al. ........... | 710/129 |
| 6,240,294 B1 | 5/2001 | Hamilton et al. ............ | 455/456 |
| 6,246,875 B1 | 6/2001 | Seazholtz et al. ............ | 455/432 |
| 6,249,516 B1 | 6/2001 | Brownrigg et al. ......... | 370/338 |
| 6,275,707 B1 | 8/2001 | Reed et al. .................. | 455/456 |
| 6,285,892 B1 | 9/2001 | Hulyalkar .................... | 455/574 |
| 6,304,556 B1 | 10/2001 | Haas ........................... | 370/254 |
| 6,313,758 B1 * | 11/2001 | Kobayashi .................. | 340/932 |
| 6,327,300 B1 | 12/2001 | Souissi et al. ............... | 375/219 |
| 6,349,091 B1 | 2/2002 | Li ............................... | 370/238 |
| 6,349,210 B1 | 2/2002 | Li ............................... | 455/450 |
| 6,370,475 B1 * | 4/2002 | Breed et al. ................. | 701/301 |
| 6,405,132 B1 * | 6/2002 | Breed et al. ................. | 701/301 |
| 6,466,863 B2 * | 10/2002 | Shirai et al. | |
| 2001/0053699 A1 | 12/2001 | McCardy et al. ........... | 455/513 |

OTHER PUBLICATIONS

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichanel TDMA Slot Assignment Protocol".

Chip Elliott anmd Bob Heile, "Self–Organizing, Sef–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanthan and Martha E. Steenstrup, "Hierarchically–Organized, Multihop Mobile Wireless Networks for Quality–of–Service Support".

Martha E. Steenstrup, "Dynamic Multipoint Virtual Circuits for Multimedia Traffic in Multihop Mobile Wireless Networks".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactial Multi–Channel Software Radios".

* cited by examiner

| MESSAGE TYPE | MESSAGE CONTENT | MESSAGE DESTINATION |
|---|---|---|
| DISTRESS | GEOGRAPHICAL LOCATION; TIME; TYPE OF EMERGENCY. | POLICE DEPT.; FIRE DEPT.; MEDICAL RESCUE. |
| VEHICLE MANAGEMENT | GEOGRAPHICAL LOCATION; TIME; VEHICLE CONDITIONS. | SELECTABLE |
| DISCRETIONARY MESSAGES | SELECTABLE | SELECTABLE |

SYSTEM AND METHOD FOR PROVIDING WIRELESS TELEMATICS STORE AND FORWARD MESSAGING FOR PEER-TO-PEER AND PEER-TO-PEER-TO-INFRASTRUCTURE A COMMUNICATION NETWORK

BACKGROUND OF THE INVENTION

1. Field of the Invention

The present invention relates to a system and method for wireless communication between mobile transceivers and wireless infrastructure elements through the use of intermediary mobile transceivers having store-and-forward message passing capabilities. Specifically, the present invention relates to a system and method for providing communication between mobile wireless transceivers and wireless infrastructure elements beyond the coverage of wireless infrastructure elements through the use of direct transceiver to transceiver communication.

2. Description of the Related Art

In recent years, a type of mobile communications network known as an "ad-hoc" network has been developed for use by the military. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each said patent application being incorporated herein by reference.

However, in current wireless systems designed to support mobile subscribers, the subscriber may only communicate with another subscriber through the network's traditional infrastructure elements. Cellular networks, such as the Analog Mobile Phone System, Time Division Multiple Access (TDMA) or Code Division Multiple Access (CDMA) cellular systems, Personal Communication Systems (PCSs), or other cellular and data networks, such as Metricom's data network and the former Ardis network, only allow subscriber communication with another subscriber through the network's infrastructure. Subscribers to the service provided by such mobile communication systems cannot communicate directly with one another using their subscriber radios or cellular telephones and therefore, need to be within range of an infrastructure element such as a base station or wired access point. Unfortunately therefore, the subscriber's ability to communicate is limited to geographical areas having such infrastructure equipment coverage.

Other wireless communication systems, such as wireless local area networks (LANs) and, in particular, 802.11 wireless LANs, have a peer-to-peer mode that enables subscriber equipment, such as Personal Computer Memory Card International Association standard (PCMCIA) card radios, to communicate directly with one another, without any infrastructure equipment, such as an access point. However, these communication systems are not designed to support mobile (i.e. vehicle based) users. The radios of such systems are typically designed to provide high throughput in an office or campus environment with little processing gain or range. They typically are not capable of providing the Doppler offsets that are found in radios traveling at highway speeds. Furthermore, these communication systems have no provision for special protocol that can provide a "store-and-forward" message-passing capability that is initiated in peer-to-peer communication and completed when the second peer arrives within range of infrastructure elements.

Moreover, in mobile wireless systems, there is no way to hand off messages without infrastructure elements. In wireless LAN systems, there is neither support for mobile subscribers, nor protocol that provides for the special classes of message that can be handled in a special manner.

Therefore, a need exists for a system and method of communication in which mobile subscribers may communicate directly with one another beyond infrastructure equipment coverage, and which includes protocol to provide store-and-forward message-passing capability that is initiated in peer-to-peer communication and completed when the storing peer arrives within infrastructure coverage to pass the stored information to the infrastructure.

SUMMARY OF THE INVENTION

An object of the present invention is to provide a system and method of peer-to-peer and peer-to-peer-to-infrastructure store-and-forward communication capabilities between communication subscribers in a communication network.

Another object of the present invention is to provide a system and method of peer-to-peer communication that is capable of providing appropriate Doppler offsets to enable peer-to-peer communications between highly mobile communication subscribers.

A further object of the present invention is to provide a protocol through which information communicated between mobile subscribers in peer-to-peer communication may be stored and later forwarded to a destination through wireless infrastructure elements when detected by the mobile subscriber that is storing the information.

These and other objects are substantially achieved by providing a system and method for sending and receiving status and request-for-help messages automatically between mobile host computers and transceivers and ultimately, to an appropriate destination via a wireless infrastructure. When wireless infrastructure coverage is not available, a host computer and transceiver will communicate the necessary information to a wireless infrastructure via a passing mobile host computer and transceiver located, for instance, in a vehicle. In this case, the message would be stored in the passing mobile host computer and transceiver until they are within range of infrastructure coverage, and then transmitted from that mobile host computer and transceiver through wireless infrastructure equipment to an appropriate destination.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE PREFERRED EMBODIMENTS

An embodiment of the present invention provides for sending status and request-for-help messages automatically to an appropriate destination via a wireless infrastructure. When such infrastructure is not available, as determined by the lack of the discovery of any infrastructure coverage, a host computer and transceiver will communicate the necessary information via a passing vehicle equipped with a like transceiver and host. That is, when the transceiver fails to locate wireless infrastructures, the host computer prepares for peer-to-peer communication, during which the necessary information is communicated to passing vehicles equipped with a like transceiver and host. Using store-and-forward message passing protocol, the vehicle status information and request for help would be stored in the transceiver of the passing vehicle, then transmitted from that vehicle through wireless infrastructure equipment to an appropriate destination, once such equipment is in range of this second vehicle.

Figure 1A:
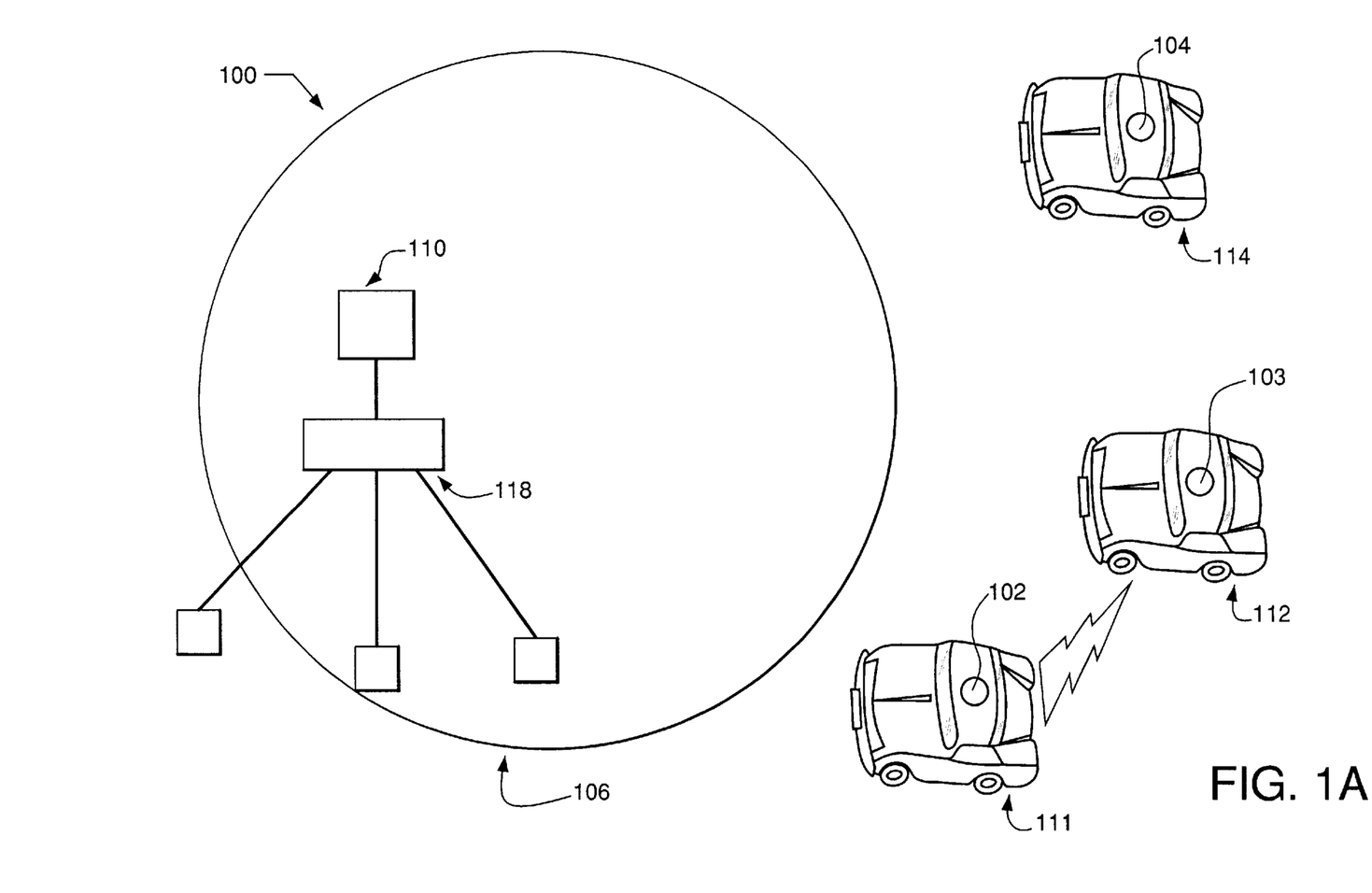
FIG. 1A is a conceptual block diagram illustrating the initial relationship between vehicle host computers and a central facility in accordance with an embodiment of the present invention.
Figure 1B:
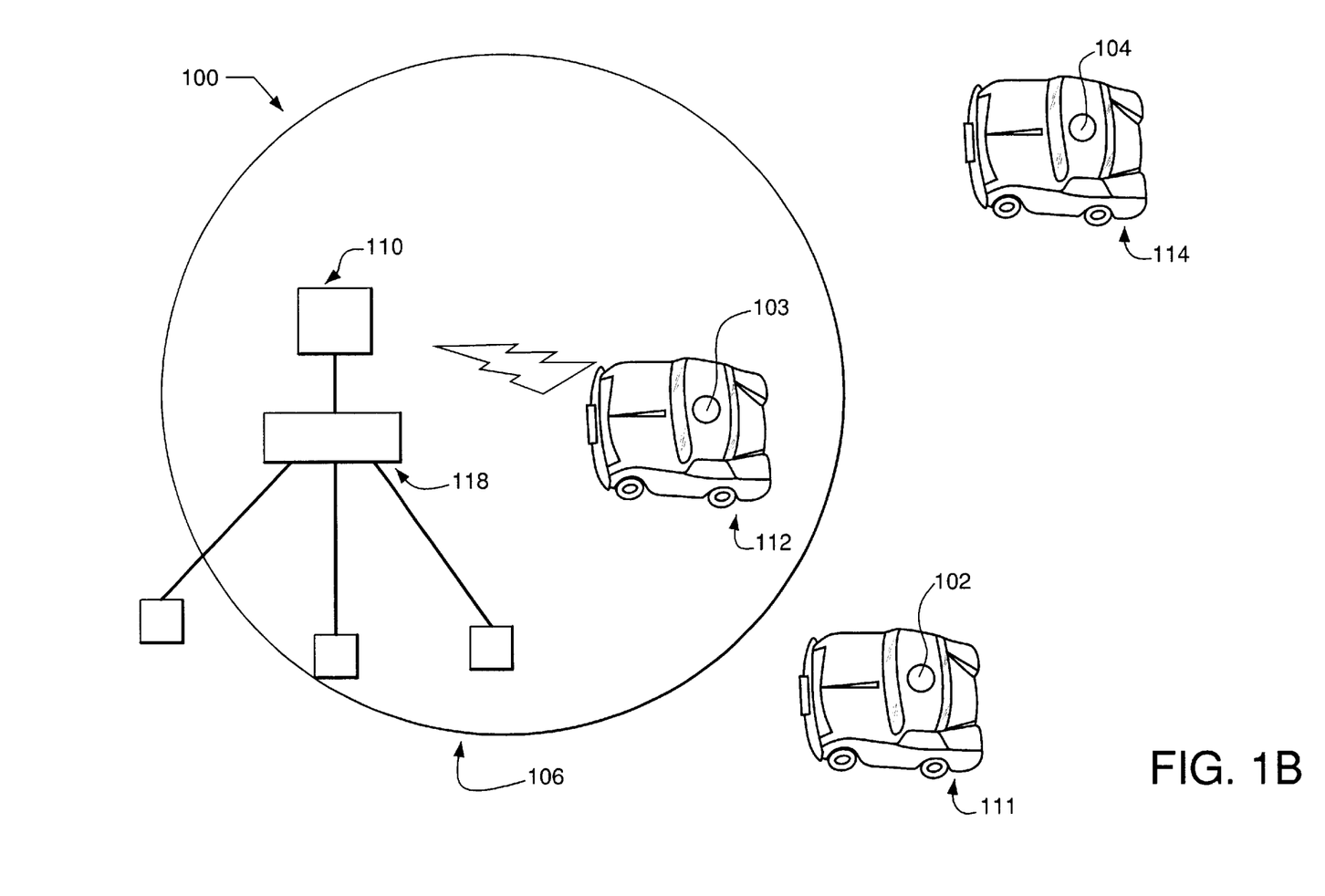
FIG. 1B is a conceptual block diagram illustrating the subsequent relationship between vehicle host computers and a central facility in accordance with an embodiment of the present invention.

FIGS. 1A and 1B are a conceptual block diagram illustrating the relationships between vehicle host computers and a central facility in a communication network 100 in accordance with an embodiment of the present invention. In FIG. 1A, first, second and third host computers 102, 103 and 104, respectively, are shown as an example of mobile communication subscribers operating beyond the coverage area of traditional wireless infrastructure elements 110, such as a base station, an access point to a wireless network, or to a local area network (LAN) as described in U.S. patent application Ser. Nos. 09/897,790, 09/815,157 and 09/815,164, the entire contents of each being incorporated herein by reference.

Each host computer in this embodiment is located in a respective vehicle 111, 112 and 113, such as an automobile, and is configured to monitor conditions in and around the vehicle, such as date, time, mileage, vehicle identification number, geographic location, accident status, speed, fluid levels, and so on. Furthermore, each host computer 102, 103 or 104, depending upon application, may prepare a message regarding these monitored conditions or discretionary matters, for communication with any of several destinations as discussed in more detail below.

Figure 2:
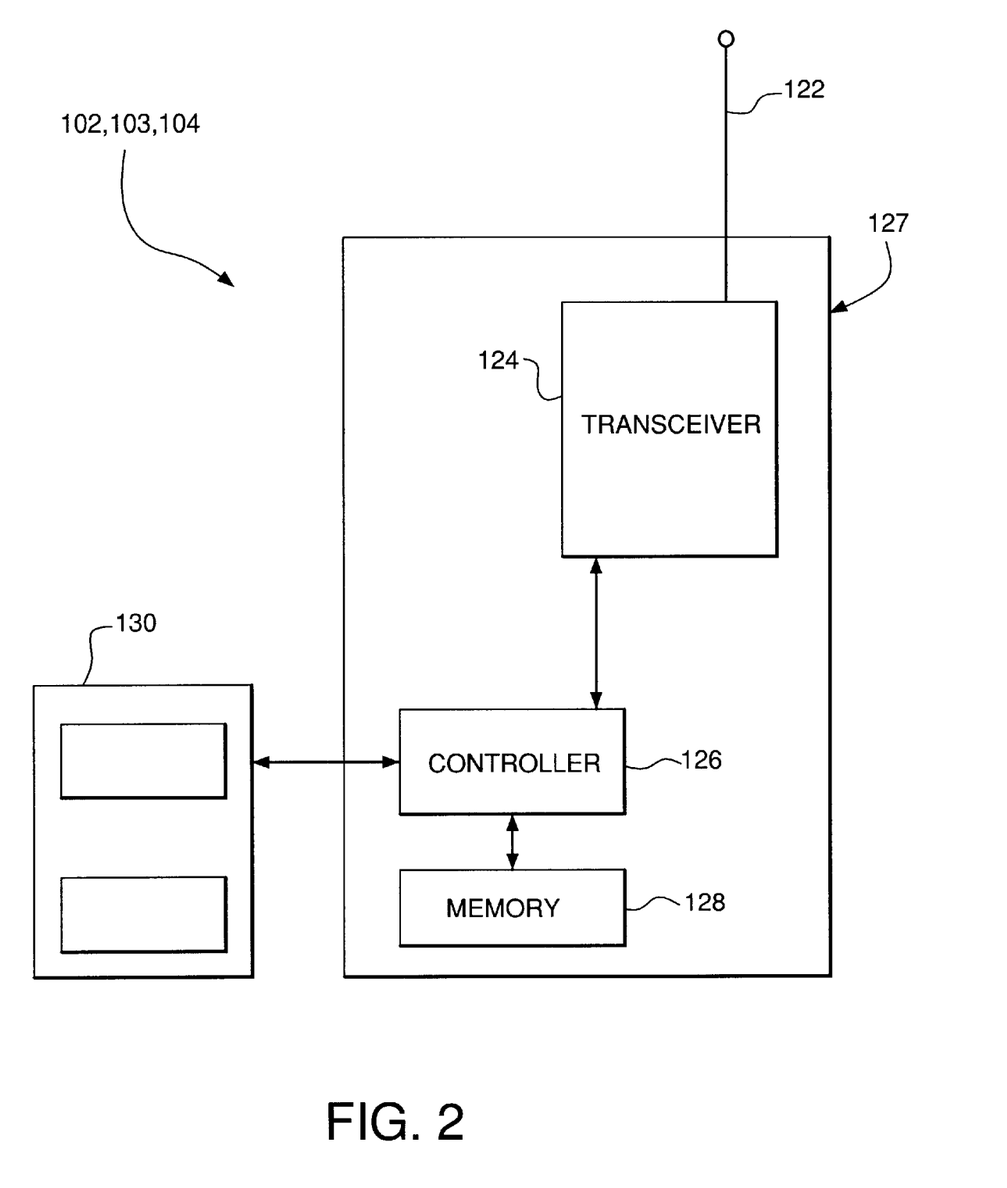
FIG. 2 is a block diagram illustrating an example of a user terminal employed in the network shown in FIGS. 1A and 1B.

Each host computer 102, 103 and 104 of FIGS. 1A and 1B can include, or be coupled to, a transceiver for sending and receiving messages to destinations that can send help, such as police or hospital in the case of accident messages, and a garage in the case of maintenance messages. As shown in FIG. 2, each host computer 130 can be electrically coupled to a controller 126 of a transceiving unit 127. The controller 126 in turn, is electrically coupled to a transceiver 124, which is coupled to an antenna 122 capable of receiving and transmitting signals such as packetized data signals via a modem. The packetized data signals can include voice, data or multimedia. Furthermore, the transceiver 124 is capable of transmitting the signals with the appropriate Doppler offsets that are found in signals transmitted by radios traveling at highway speeds as can be appreciated by one skilled in the art. The controller 126 is further electrically coupled to a memory 128, such as a random access memory (RAM), that is capable of storing, among other things, routing information pertaining to itself and other devices in the network. Each controller 126 also includes the appropriate hardware and software to perform Internet Protocol (IP) and Address Resolution Protocol (ARP), the purposes of which can be readily appreciated by one skilled in the art. Optionally, the appropriate hardware and software to perform transmission control protocol (TCP) and user datagram protocol (UDP) may also be included.

In FIGS. 1A and 1B, the controlled transceiver described above enables the status and request-for-help messages to be sent automatically to an appropriate destination via the wireless infrastructure equipment 110. When such infrastructure is not available, as determined by the vehicle's transceiver, the vehicle's host computer and transceiver will communicate the necessary information via a passing vehicle equipped with a like transceiver and host. In this case, using store-and-forward message passing protocol, the vehicle status information and request-for-help message would be stored in the transceiver of the passing vehicle until within range of infrastructure coverage, then transmitted from that vehicle through wireless infrastructure equipment to an appropriate destination.

In one embodiment of the present invention shown in FIG. 1A, should vehicle host computer 102 require the communication of a prepared message regarding vehicle conditions, direct communication via wireless infrastructure equipment 110 is not possible, as host computer 102 is beyond the coverage area shown as bounded by 106. Therefore, the prepared message is communicated to vehicle host computer 103. Each host computer 102, 103 and 104 includes a protocol allowing the storage of communicated messages, followed by transmission of stored messages from the receiving vehicle to wireless infrastructure equipment once such equipment coverage is detected. Therefore, as shown in FIG. 1B, as the mobile vehicle host computer 103 enters the coverage area bounded by 106, protocol directs the transmission of the stored message received from host computer 102, to a final destination via infrastructure equipment 110.

Figure 3:
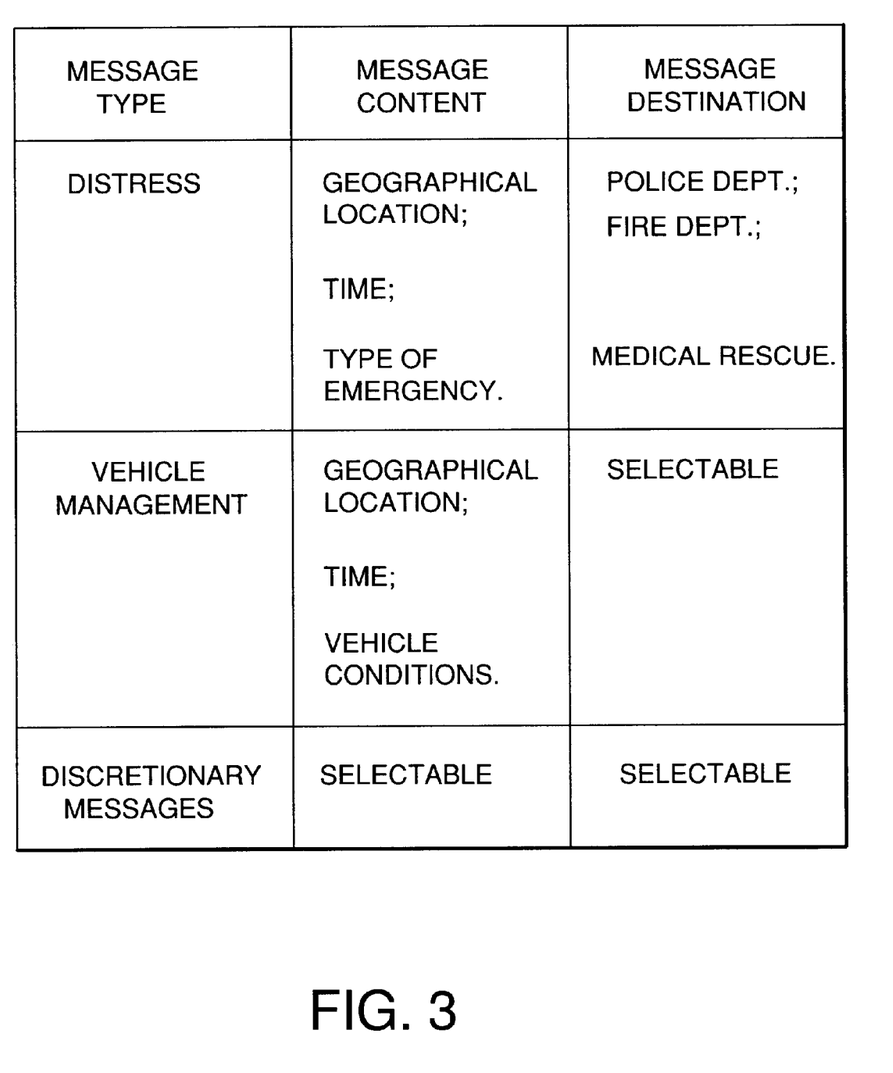
FIG. 3 is a table illustrating message types in use with the embodiment of the present invention shown in FIGS. 1A and 1B.

Prior to transmission, however, the receiving host computer 103 first determines utilization of infrastructure equipment 110 and will transmit the stored message received from host computer 102 only after a comparison of message type and equipment utilization. Three message types are shown in FIG. 3 as one example of message types used with an embodiment of the present invention. In FIG. 3, each message would have a descending level of transmission priority, with distress messages having the highest level of priority, management messages having a somewhat less level of priority, and discretionary messages having the lowest level of priority. Distress messages would be forwarded at the first access point to infrastructure equipment 110 (first intelligent access point IAP) identified by the vehicle host computer 103. Management messages would be forwarded under certain conditions, for example, when the utilization of the infrastructure equipment 110 is below some predetermined percentage, likewise, discretionary messages would be forwarded when utilization is below some lower predetermined percentage. In doing so, capacity is protected for distress messages in areas with limited infrastructure equipment capacity.

A central facility, such as a Mobile Internet Switching Controller (MISC), shown at 118 in FIGS. 1A and 1B, would maintain a store-and-forward server that all "fire and forget" messages would be delivered to. As shown in FIG. 3, message examples may include, (1) distress messages, which are configured to include information such as geographical location and time information, (2) management messages, which may also be configured with geographical location and time information, in addition to quantitative values for maintenance/vehicle management purposes, and (3) discretionary communication information, which may be configured to include any information.

Each resulting message, based upon it's content, will be directed to different destinations. Distress messages would be sent to the police or some comparable agency for immediate action. Management information would be sent to a destination identified by the vehicle owner and would be triggered by rules that the vehicle owner would specify. Triggers that might be employed include geographical, temporal, and vehicle speed. Discretionary message communication would be limited to relatively short messages in order to keep overhead within reason and may be limited to the Maximum Transmission Unit (MTU) size. The number sent by one transceiver would be limited over a period of time by the vehicle transceiver, and may also be configured in reply to the subscriber's management information base (MIB) from the MISC by Simple Network Management Protocol (SNMP) or some other similar protocol.

In many instances, a number of identical messages must be sent to reasonably insure one reaches the final destination. Therefore the host computer 102 in FIGS. 1A and 1B calculates an optimum number of identical messages and sends one to each passing vehicle until this value is reached. The total number of messages sent would be determined based on the capacity of the network in the area of a given Mobile Internet Switching Controller (MISC), optimized over time to achieve both a high probability of rapid delivery and a minimal impact on network overhead. This number would be configured within the host computer's management information base, and may be changed from the MISC through a protocol, such as Simple Network Management Protocol (SNMP).

Figure 4:
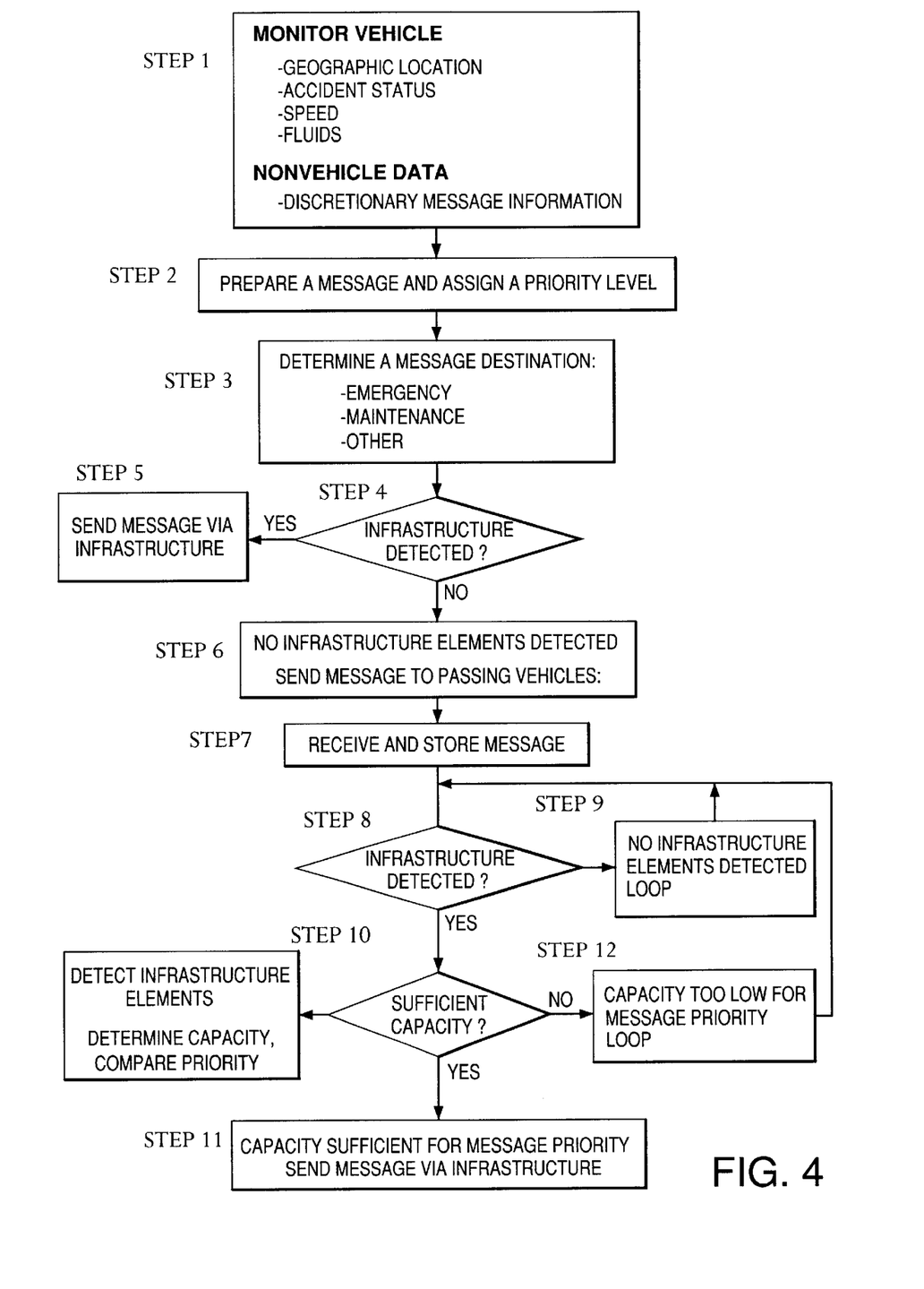
FIG. 4 is a flow chart illustrating an example of the functions executed by host computers within peer-to-peer and peer-to-peer-to-infrastructure communication as shown in FIGS. 1A and 1B.

FIG. 4 is a flow chart of an embodiment of the present invention illustrating the functions executed by host computers within peer-to-peer and peer-to-peer-to-infrastructure communication. In the example outlined in FIG. 4, steps 1–6 apply to a first vehicle which has prepared a message for communication but is unable to do so due to being beyond infrastructure coverage. This first vehicle corresponds to the vehicle 111 described in FIGS. 1A and 1B, and the first host computer executing steps 1–6 corresponds to host computer 102 as described in FIGS. 1A and 1B. Steps 7–12 apply to a second vehicle receiving the prepared message in passing. This second vehicle corresponds to vehicle 112 described in FIGS. 1A and 1B and the second host computer executing steps 7–12 corresponds to host computer 103 as described in FIGS. 1A and 1B.

In step 1, the first host computer may be configured to continuously monitor the vehicle and a variety of surrounding conditions, such as geographic location, vehicle accident status, vehicle speed, or miscellaneous vehicle fluid levels. Both first and second host computers contain protocol allowing the preparation, storage and transmission of various communication messages based on this monitored information, as well as discretionary messages as directed by the host computer. In step 2, the first host computer prepares a message based upon the monitored vehicle conditions or discretionary information and assigns a priority level. Based upon the created message, the first host computer determines a message destination in step 3, which can adequately address the monitored condition. Destinations may include police or medical assistance for priority accident messages, or maintenance facilities for vehicle condition messages.

In step 4, the first host computer directs the search for the presence of wireless infrastructure coverage for direct message contact. If infrastructure coverage is detected, the message is sent via infrastructure in step 5 and the communication ends. If an absence of coverage is detected, the first host computer prepares for peer-to-peer, and subsequently, peer-to-peer-to-infrastructure communication. In step 6 the first host computer determines the number of identical prepared messages which must be sent to reasonably insure one reaches the final destination and thereafter, sends one prepared message to each passing vehicle containing like host computers until this value is reached.

In step 7, using store-and-forward message passing protocol, the second host computer receives and stores the message sent by the first host computer. As the second host computer is directed to send the stored message upon detection of infrastructure coverage, the second host computer directs the search for the presence of wireless infrastructure coverage in step 8. If infrastructure coverage is not detected, the second host computer directs the continued search for coverage in step 9. If infrastructure coverage is detected, the second host computer determines the capacity of the infrastructure coverage and evaluates the priority of the stored message in step 10. As discussed above, distress messages would be forwarded at the first access point to infrastructure equipment. Management messages would be forwarded only when the utilization of the infrastructure equipment is below some predetermined percentage, and discretionary messages would be forwarded when utilization is below some lower predetermined percentage.

If the second host computer determines infrastructure coverage capacity is sufficient, the stored message is sent and the communication ends. If the coverage capacity is not sufficient, in step 12 the second host computer will not send the message and return to step 8 and search for alternate infrastructure coverage. The second host computer will continuously search for infrastructure coverage with adequate capacity until the message is sent.

The context for use of the system and method is the situation in which a vehicle has reached an area that is outside the coverage of wireless infrastructure elements. The vehicle may be disabled, for example, having run out of gas or having run into a tree, and a message containing this information and requests for assistance needs to be sent. Additional information concerning the geographic location of the disabled car may also be sent. This information can be derived through a GPS receiver in the vehicle or though some other means.

Following the disabling event, a host computer in the vehicle that monitors vehicle functions would then initiate a distress communication through a wireless transceiver in the vehicle in the manner described above. A message would be created that contains information that a collision has occurred, that the vehicle is out of service, and assistance is required.

Another scenario in which an embodiment of the present invention may be used includes the tracking of a vehicle traveling outside an area served by wireless infrastructure equipment. At predetermined intervals, the host computer could be programmed to send out location information to a parent, police or car rental company. The host computer may also be programmed to send out location information when certain predetermined events occur, such as the vehicle's stopping, starting or exceeding a particular speed or traveling beyond some predetermined boundary.

Another scenario in which an embodiment of the present invention may be used is to notify a remote agent of the need for certain maintenance, such as an oil change or tire rotation.

Still another scenario in which an embodiment of the present invention may be used is to communicate non-automated information such as short text messages and small voice, graphics or video files to another person not within the general vicinity (or multi-hop wireless range) of the sending vehicle. Such messages may not be limited to vehicle status and may include any subject matter.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for enabling a terminal at a location outside a coverage area of infrastructure equipment to communicate with said infrastructure equipment, comprising:

monitoring at least one condition of a first vehicle at which a first terminal is disposed;

preparing a message based on said monitored vehicle condition;

controlling said first terminal to send said message to another vehicle when a lack of infrastructure equipment coverage is detected;

storing said message in a second terminal disposed on said second vehicle; and sending said message from said second terminal to said infrastructure equipment when said second terminal detects a presence of said infrastructure equipment coverage.

2. A method as claimed in claim 1, wherein said monitored condition comprises at least one of the following relative to said first vehicle:

geographic location, accident status, speed, fluid levels and discretionary message inputs.

3. A method as claimed in claim 1, wherein said prepared message comprises information pertaining to said monitored condition.

4. A method as claimed in claim 1, wherein said first terminal is adapted to determine a destination for said prepared message based on said monitored vehicle conditions.

5. A method as claimed in claim 1, wherein said first terminal is adapted to determine a cumulative number of said prepared messages to send.

6. A method as claimed in claim 1, wherein said first terminal is adapted to assign said message one of a plurality of priority levels.

7. A method as claimed in claim 1, wherein said first terminal is adapted to detect infrastructure equipment coverage.

8. A method as claimed in claim 1, wherein said first terminal is adapted to send said message with Doppler effect offsets.

9. A method as claimed in claim 1, wherein said second terminal is adapted to receive and store said message using store-and-forward protocols.

10. A method as claimed in claim 1, wherein said second terminal is adapted to detect infrastructure equipment coverage.

11. A method as claimed in claim 1, wherein said second terminal is adapted to determine whether utilization levels of said infrastructure equipment coverage will allow sending messages of a particular one of a plurality of priority levels.

12. A system of wireless communications between infrastructure equipment and a terminal at a location outside a coverage area of said infrastructure equipment, comprising:

a first terminal, adapted to monitor at least one condition of a first vehicle at which said first terminal is disposed, and to send a message based on said monitored condition to another vehicle when a lack of infrastructure equipment coverage is detected by said first terminal; and a second terminal, disposed at a second vehicle, and adapted to receive and store said message, and further adapted to send said message from said second terminal to said infrastructure equipment when said second terminal detects a presence of said infrastructure equipment.

13. A system as claimed in claim 12, wherein said first terminal comprises:

a first transceiver, adapted to transmit said message; and a first host computer, adapted to monitor said condition and to provide said message to said transceiver.

14. A system as claimed in claim 12, wherein said monitored condition comprises at least one of the following relative to said first vehicle:

geographic location, accident status, speed, fluid levels and discretionary message inputs.

15. A system as claimed in claim 12, wherein said prepared message comprises information pertaining to said monitored condition.

16. A system as claimed in claim 12, wherein said first terminal is further adapted to determine a destination for said prepared message based on said monitored vehicle conditions.

17. A system as claimed in claim 12, wherein said first terminal is further adapted to determine a cumulative number of said prepared message to send.

18. A system as claimed in claim 12, wherein said first terminal is further adapted to assign said message one of a plurality of priority levels.

19. A system as claimed in claim 12, wherein said first terminal is further adapted to detect infrastructure equipment coverage.

20. A system as claimed in claim 12, wherein said first terminal is further adapted to send said message with Doppler effect offsets.

21. A system as claimed in claim 12, wherein said second terminal comprises:
   a transceiver, adapted to receive said message;
   a memory, adapted to store said message; and
   a controller, adapted to control said transceiver to retransmit said message to said infrastructure equipment upon detection of said infrastructure equipment.

22. A system as claimed in claim 12, wherein said second terminal is further adapted to receive and store said message using store-and-forward protocols.

23. A system as claimed in claim 12, wherein said second terminal is further adapted to detect infrastructure equipment coverage.

24. A system as claimed in claim 12, wherein said second terminal is further adapted to determine whether utilization levels of said infrastructure equipment coverage will allow sending messages of a certain priority level.

25. A terminal for wireless communication at a location outside a coverage area of infrastructure equipment, comprising:
   a transceiver; and
   a controller, adapted to monitor at least one condition of a vehicle at which said terminal is disposed, and to control said transceiver to send a message including information pertaining to said monitored condition to another vehicle when said controller detects a lack of presence of said infrastructure equipment.

26. A terminal as claimed in claim 25, wherein:
   said transceiver is further adapted to receive and store another message from another terminal; and
   said controller is further adapted to control said transceiver to send said stored message to said infrastructure equipment when said controller detects a presence of said infrastructure equipment.

* * * * *

UNITED STATES PATENT AND TRADEMARK OFFICE
CERTIFICATE OF CORRECTION

PATENT NO.    : 6,580,981 B1
DATED         : June 17, 2003
INVENTOR(S)   : Masood Garahi and William C. Elkington It is certified that error appears in the above-identified patent and that said Letters Patent is hereby corrected as shown below:

<u>Title page,</u>
Item [75], Inventor, please change the name of the first inventor to
-- Masood Garahi --.

Signed and Sealed this

Second Day of September, 2003

JAMES E. ROGAN
*Director of the United States Patent and Trademark Office*